US010110751B2

(12) United States Patent
Ofir et al.

(10) Patent No.: US 10,110,751 B2
(45) Date of Patent: Oct. 23, 2018

(54) METHODS AND SYSTEMS FOR CONNECTING ISOLATED NETWORKS

(71) Applicant: MOTOROLA SOLUTIONS, INC., Chicago, IL (US)

(72) Inventors: Gabi Ofir, Reshon Letzion (IL); Rony Gotman, Tel Aviv-Yaffo (IL); Itzhak Shperling, Bnei-Brak (IL); Danny Zadok, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/392,529

(22) Filed: Dec. 28, 2016

(65) Prior Publication Data

US 2018/0183937 A1   Jun. 28, 2018

(51) Int. Cl.
*H04W 40/00* (2009.01)
*H04M 7/12* (2006.01)
*H04L 12/46* (2006.01)
*H04L 29/06* (2006.01)
*H04J 13/00* (2011.01)

(52) U.S. Cl.
CPC ...... *H04M 7/1225* (2013.01); *H04L 12/4641* (2013.01); *H04L 69/08* (2013.01); *H04J 13/00* (2013.01); *H04M 7/123* (2013.01)

(58) Field of Classification Search
CPC . H04M 7/1225; H04M 7/123; H04L 12/4641; H04L 69/08; H04J 13/00
USPC ........................................ 455/448; 370/338
See application file for complete search history.

(56) References Cited

U.S. PATENT DOCUMENTS 9,144,103 B2   9/2015   Klein
2014/0348068 A1*  11/2014   Morper ................ H04W 88/16
                                         370/328

FOREIGN PATENT DOCUMENTS

EP         2706782         3/2014

* cited by examiner

*Primary Examiner* — Marcos Batista
(74) *Attorney, Agent, or Firm* — Michael Best & Friedrich LLP (57) ABSTRACT

Methods and systems for connecting isolated networks. One method includes storing, in a database of a network core, information related to a first set of communication devices associated with a first radio access network and a second set of communication devices associated with a second radio access network. The method further includes communicating between the network core and a transceiver of the first radio access network via an interface. The method further includes communicating, via the interface, between the network core and a virtual transceiver that represents an actual transceiver of the second radio access network.

20 Claims, 6 Drawing Sheets

METHODS AND SYSTEMS FOR CONNECTING ISOLATED NETWORKS

BACKGROUND OF THE INVENTION

Public safety agencies responding to an incident (for example a building fire, a criminal pursuit or other law enforcement activity, a natural disaster, a medical incident, a traffic accident, and the like) may coordinate response efforts using wireless communications devices. The wireless communications devices communicate data, video, voice, and other traffic through one or more network sub-systems (for example, a Long Term Evolution (LTE) wireless network) providing communications coverage at or near the area of the incident. Two or more network sub-systems may be connected to form an incident area network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Incident area and radio access networks provide, among other things, a communications infrastructure for first responders and others at an incident scene. However, incident area and radio access networks typically provide a limited area of coverage and may be isolated from other incident area and radio access networks (for example, remotely-located incident area networks).

One embodiment provides a method of connecting isolated networks. The method includes storing, in a database of a network core, information related to a first set of communication devices associated with a first radio access network and a second set of communication devices associated with a second radio access network. The method further includes communicating between the network core and a transceiver of the first radio access network via an interface. The method further includes communicating, via the interface, between the network core and a virtual transceiver that represents an actual transceiver of the second radio access network.

Another embodiment provides a communications system for connecting isolated networks. The communications system includes a network core including a database storing information related to a first set of communication devices associated with a first radio access network and a second set of communication devices associated with a second radio access network. The communications system further includes a first virtual transceiver representing an actual transceiver of the second radio access network. The communications system further includes an interface configured to communicate between the network core and a transceiver of the first radio access network and between the network core and the first virtual transceiver.

Another embodiment provides a communications system for connecting isolated networks. The communications system includes an Evolved Packet Core including a database storing information related to a first set of communication devices associated with a first Long Term Evolution network and a second set of communication devices associated with a second Long Term Evolution network. The communications system further includes a first virtual Evolved Node B representing an actual Evolved Node B of the second Long Term Evolution network. The communications system further includes an S1 interface configured to communicate between the Evolved Packet Core and an Evolved Node B of the first Long Term Evolution network and between the Evolved Packet Core and the first virtual Evolved Node B.

Figure 1:
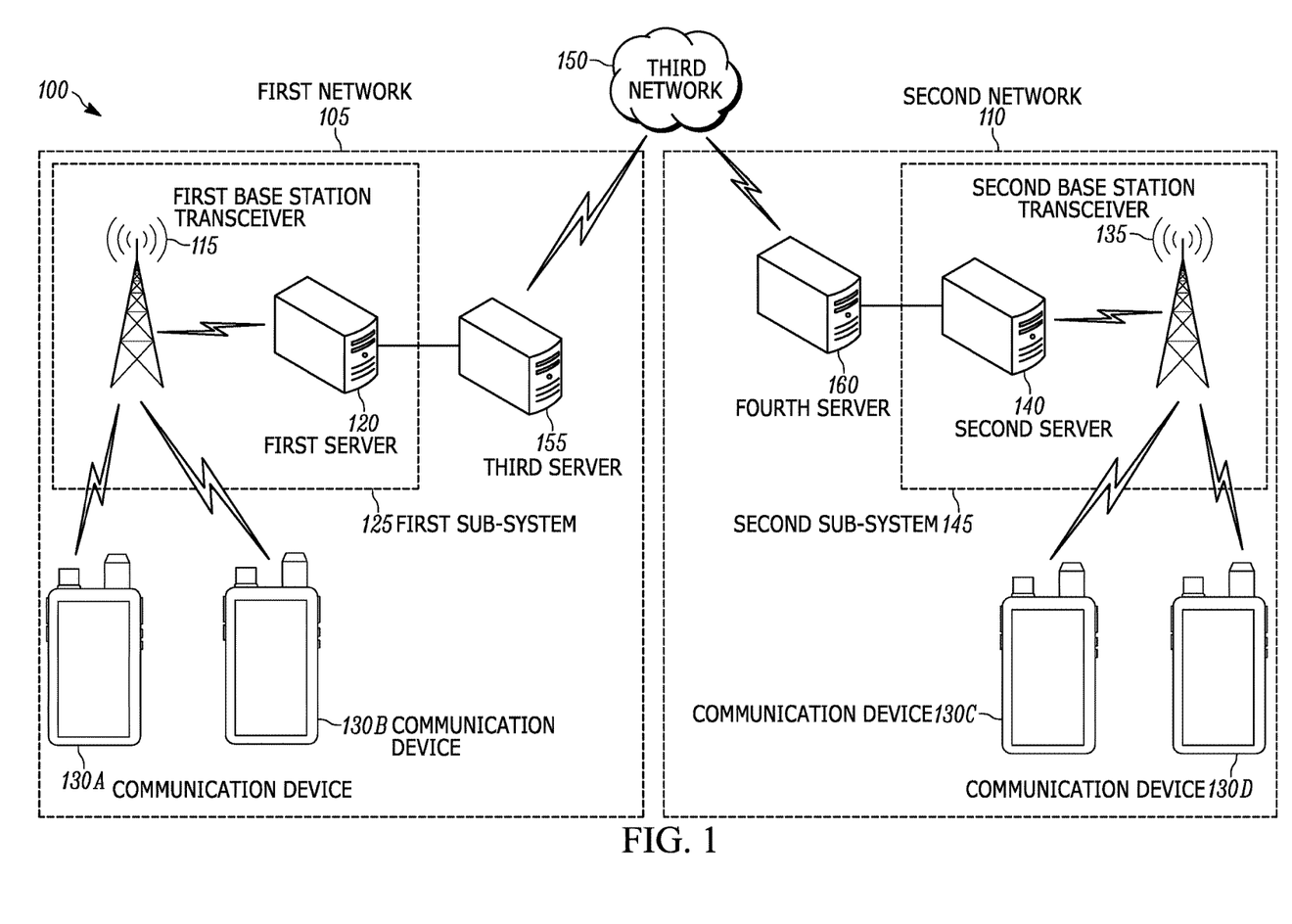
FIG. 1 is a diagram of a communications system according to one embodiment.

FIG. 1 is a diagram of a communications system 100 according to one embodiment. In the example illustrated, the communications system 100 includes a first network 105 and a second network 110. In some embodiments, the first network 105 and the second network 110 may be radio access networks (for example, Long Term Evolution (LTE) networks). The first network 105 includes a first transceiver 115 (for example, a base station such as an Evolved Node B (eNodeB) which will be referred to hereinafter as first base station transceiver 115) coupled to a first server 120. The first base station transceiver 115 and the first server 120 may be referred to as a first sub-system 125 of the first network 105. Although FIG. 1 shows the first server 120 wirelessly coupled to the first base station transceiver 115, in some embodiments, the first server 120 is coupled to the first base station transceiver 115 through a wired connection or a combination of wired and wireless connections. The first server 120 interprets signals received by the first base station transceiver 115 from other devices. The first server 120 also controls transmission of signals from the first base station transceiver 115 to other devices. In the following description, when the first base station transceiver 115 is described as transmitting data, forwarding data, and the like, the first server 120 is performing these tasks and controlling the first base station transceiver 115 to transmit corresponding signals.

The first network 105 also includes communication devices 130A and 130B. The communication devices 130A and 130B are configured to wirelessly communicate with each other through the first base station transceiver 115 (for example, by sending and receiving radio signals). The first base station transceiver 115 wirelessly communicates with communication devices located within a predetermined distance from first base station transceiver 115 (for example, the communication devices 130A and 130B). In some embodiments, the first network 105 provides Long Term Evolution cellular service to communication devices within a limited area (for example, within wireless communication range of the first base station transceiver 115).

Although only one sub-system 125 is shown in the first network 105 of FIG. 1, in some embodiments, the first network 105 includes two or more sub-systems communicatively coupled to form an incident area network. Such additional sub-systems may expand the area in which the first network 105 provides Long Term Evolution cellular service to communication devices.

The second network 110 includes a second transceiver 135 (referred to hereinafter as second base station transceiver 135) coupled to a second server 140 that together may be referred to as a second sub-system 145. The second network 110 also includes communication devices 130C and 130D. The components of the second network 110 are similar to those described above with respect to the first network 105 and perform similar functions. Like the first network 105, in some embodiments, the second network 110 may include fewer or additional components. For example, the second network 110 may include additional communication devices or additional sub-systems. Although FIG. 1 shows the first network 105 and the second network 110 with similar components, in some embodiments, the first network 105 and the second network 110 are not identical and include different components or different numbers of similar components.

In the following description, when explaining how a single communication device functions, a reference to communication device 130 is used. It is not necessary, however, that the communication devices 130A through 130D be identical. The communication devices 130A through 130D are merely examples. In some embodiments, one or both of the first network 105 and the second network 110 may include more or fewer communication devices than illustrated in FIG. 1.

As illustrated in FIG. 1, the communication device 130 may be a handheld communication device, for example, a mobile telephone or other portable communication device, mobile radio, smart watch or other smart wearable, drone, or other device configured to communicate over at least one of the first network 105 and the second network 110. In some embodiments, the communication device 130 may be a handheld radio carried by a public safety officer or first responder, such as a police officer. In some embodiments, the communication device 130 may be a smart phone carried by a person for personal use. In some embodiments, the communication device 130 may be a mobile communication device mounted in or on a vehicle (for example, a police vehicle). In some embodiments, the communication device 130 may be a device maintained, for example, at a call center or public safety command center.

In some embodiments, the first network 105 has a first coverage area in which network communications (for example, between the first base station transceiver 115 and the communication devices 130A and 130B) occur over a first communications protocol. In other words, the first network 105 operates according to the first communications protocol. The second network 110 has a second coverage area in which network communications (for example, between the second base station transceiver 135 and the communication devices 130C and 130D) also occur over the first communications protocol. However, in some embodiments, the networks 105 and 110 are remotely located from each other and a distance between the first network 105 and the second network 110 may be greater than a coverage radius of each of the first network 105 and the second network 110. As a consequence, there is no overlap in their respective coverage areas or at least a portion of their respective coverage areas do not overlap. In such circumstances, the first network 105 and the second network 110 (or at least some communication devices in each network 105 and 110) may not be able to communicate with each other over the first communications protocol. In other words, in some embodiments, the first base station transceiver 115 may not be able to communicate with the second base station transceiver 135. Under such circumstances, the networks 105 and 110 may be considered to be isolated from one another.

In some embodiments, the communications system 100 also includes a third network 150 (in other words, a secondary communications network) that includes a third server 155 in the first network 105 and a fourth server 160 in the second network 110. As shown in FIG. 1, the third server 155 is coupled to the first server 120 through a wired connection and the fourth server 160 is coupled to the second server 140 through a wired connection. In some embodiments, these respective servers may be coupled to each other through a wireless connection or a combination of wired and wireless connections. In some embodiments, the third server 155 and the fourth server 160 may communicate with each other in accordance with a second communications protocol over the third network 150. In some embodiments, the third network 150 is a land mobile radio (LMR) narrowband network, the Internet, a public switched telephone network, or the like. In some embodiments, the third network 150 may also include a combination of the networks mentioned previously herein. In some embodiments, the third network 150 may have a third coverage area in which network communications may occur over the second communications protocol. In some embodiments, the third coverage area is larger than the first coverage area of the first network 105 and the second coverage area of the second network 110. In some embodiments, the third coverage area overlaps at least a portion of the first coverage area and the second coverage area. Accordingly, in some embodiments, the third network 150 may allow a communication device in the first network 105 to communicate with a communication device in the second network 110 over the second communications protocol as explained in greater detail below.

Figure 2:
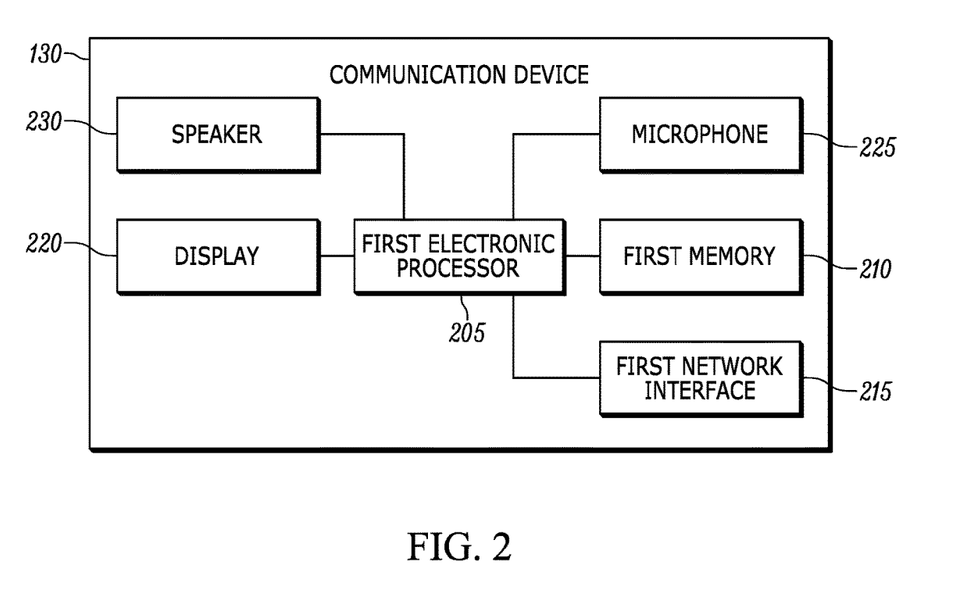
FIG. 2 is a diagram of a communication device included in the communications system of FIG. 1 according to one embodiment.

FIG. 2 is a diagram of the communication device 130 of the communications system 100 according to one embodiment. The communication device 130 includes a first electronic processor 205 (for example, a microprocessor or another electronic device). The first electronic processor 205 may include input and output interfaces (not shown) and be electrically coupled to a first memory 210, a first network interface 215, a display 220, a microphone 225, and a speaker 230. In some embodiments, the communication device 130 may include fewer or additional components in configurations different from that illustrated in FIG. 2. For example, in some embodiments, the communication device 130 also includes a camera and a location component (for example, a global positioning system receiver). In some embodiments, the communication device 130 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from one of the base station transceivers 115 and 135 (depending on which network 105 and 110 the communication device 130 is a part of). For example, the first network interface 215 may include a radio transceiver for wirelessly communicating with the base station transceiver 115 or 135 (for example, using radio signals). Alternatively or in addition, the first network interface 215 may include a connector or port for receiving a wired connection to the base station transceiver 115 or 135, such as an Ethernet cable. The first electronic processor 205 receives electrical signals representing sound from the microphone 225 and may communicate information relating to the electrical signals to the base station transceiver 115 or 135 through the first network interface 215, such as for receipt by another communication device. Similarly, the first electronic processor 205 may output data received from the base station transceiver 115 or 135 or another device through the first network interface 215 to an output device of the communication device 130 such as the speaker 230, the display 220, or a combination thereof.

Figure 3:
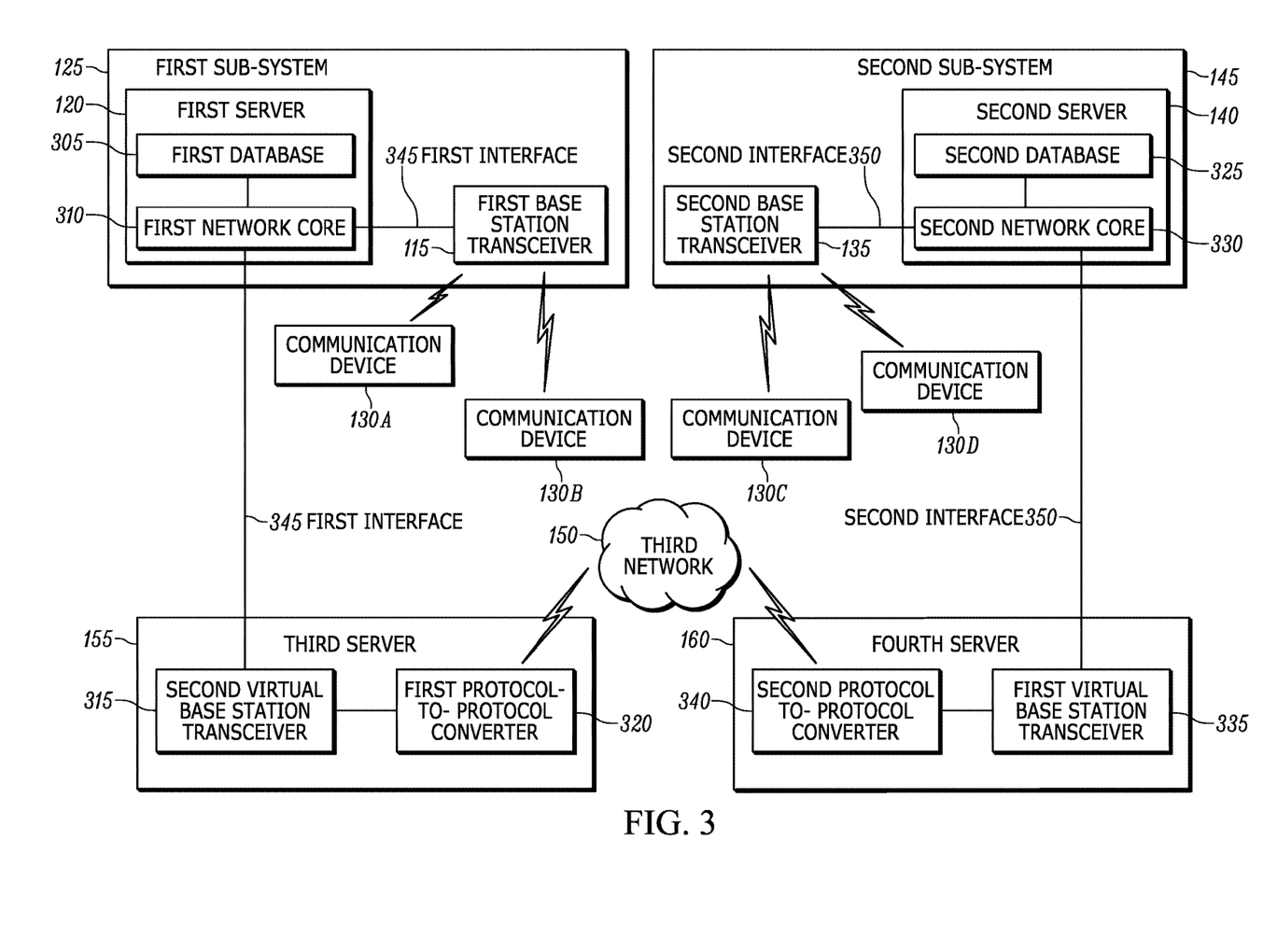
FIG. 3 is a diagram of a first sub-system, a second sub-system, a third server, and a fourth server included in the communications system of FIG. 1 according to one embodiment.
Figure 4:
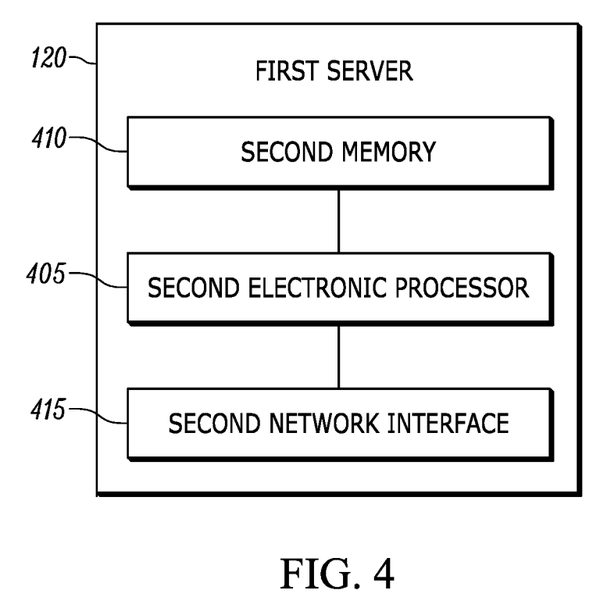
FIG. 4 is a diagram of the physical devices of a first server included in the communications system of FIG. 1 and included in the first sub-system of FIG. 3 according to one embodiment.
Figure 5:
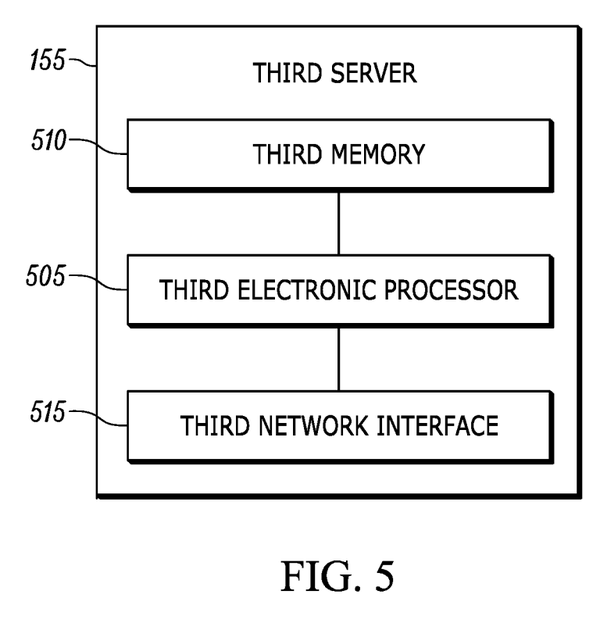
FIG. 5 is a diagram of the physical devices of the third server included in the communications system of FIG. 1 according to one embodiment.

FIG. 3 is a diagram of the first sub-system 125, the second sub-system 145, the third server 155, and the fourth server 160 of the communications system 100 according to one embodiment. FIG. 3 illustrates additional details of the servers 120, 140, 155, and 160. As explained previously herein, the first sub-system 125 includes the first base station transceiver 115 and the first server 120. The second sub-system 145 includes the second base station transceiver 135 and the second server 140. In the example illustrated in FIG. 3, the first server 120 includes a first database 305 and a first network core 310. Similarly, the second server 140 includes a second database 325 and a second network core 330. The third server 155 includes a second virtual transceiver 315 (referred to hereinafter as second virtual base station transceiver 315) and a first protocol-to-protocol converter 320. Similarly, the fourth server 160 includes a first virtual transceiver 335 (referred to hereinafter as first virtual base station transceiver 335), and a second protocol-to-protocol converter 340. In some embodiments, one or more of the servers 120, 140, 155, and 160 include additional components. One or more of the components of the servers 120, 140, 155, and 160 may be implemented on one or more electronic devices (for example, including an electronic processor, a memory, and a network interface) as illustrated in FIGS. 4 and 5. When implemented on multiple electronic devices, the components of the servers 120, 140, 155, and 160 as well as additional components may be coupled to one another by one or more control or data buses or wireless communication links, or a combination thereof.

In some embodiments, the network cores 310 and 330 are Evolved Packet Cores (EPCs) that includes components for controlling the operation of and routing traffic within and outside of the respective first sub-system 125 and second sub-system 145. The network cores 310 and 330 also include components for authenticating and associating communication devices to the respective first sub-system 125 and second sub-system 145 (for example, attaching communication devices to a base station transceiver). In some embodiments, the network cores 310 and 330 include a mobility management entity, a serving gateway, a packet data node gateway, a home subscriber server, and network nodes (not shown). As shown in FIG. 3, the first network core 310 communicates with the first base station transceiver 115 over a first interface 345. The second network core 330 communicates with the second base station transceiver 135 over a second interface 350. In some embodiments, the first interface 345 and the second interface 350 are S1 interfaces according to Long Term Evolution network protocol.

The base station transceivers 115 and 135 include hardware and software components for communicating wirelessly with devices and networks outside of the respective first sub-system 125 and second sub-system 145. For example, in some embodiments, the network cores 310 and 330 control their respective base station transceivers 115 and 135 to communicate with at least one of the communication devices 130A through 130D. The databases 305 and 325 store information relating to devices configured to communicate within the respective first network 105 and the second network 110. For example, the first database 305 stores information that may be used by the first network core 310 for identification of communication devices 130A through 130D and addressing of messages from communication devices 130A through 130D. In some embodiments, the databases 305 and 325 store information relating to which base station transceiver each communication device 130A through 130D is attached to.

The second virtual base station transceiver 315 is a virtual instance of the second base station transceiver 135 that represents the actual second base station transceiver 135 of the second network 110. The second virtual base station transceiver 315 is located on the third server 155 and communicates with the first network core 310 through the first interface 345 (in other words, the first network core 310 uses the same interface to communicate to both the first base station transceiver 115 and the second virtual base station transceiver 315). From the perspective of the first network core 310, the first sub-system 125 includes two base station transceivers, for example, the first base station transceiver 115 and the second virtual base station transceiver 315. Communication devices belonging to the second network 110 (for example, the communication devices 130C and 130D) are registered as local communication devices in both the second network core 330 (through an attachment process of communicating over the second network 110) and the first network core 310 (through communication over the third network 150 as explained in greater detail below).

For example, when the communication device 130C attaches to the second base station transceiver 135, its identification and address information is stored in the second database 325. The second network core 330 also transmits the identification and address information of the communication device 130C to the first sub-system 125 over the third network 150 through the protocol-to-protocol converters 320 and 340 to be stored in the first database 305. For example, when the communication device 130C attaches to the second base station transceiver 135, the second network core 330 may notify other base station transceivers within the second network 110 (for example, the first virtual base station transceiver 335) of such attachment. Upon receiving notification of the attachment of the communication device 130C to the second base station transceiver 135, the first virtual base station transceiver 335 may communicate the attachment of communication device 130C to the second virtual base station transceiver 315 over the third network 150 through the protocol-to-protocol converters 320 and 340. In turn, the second virtual base station transceiver 315 may communicate the attachment of the communication device 130C to the first network core 310 which may update the first database 305. Accordingly, the communication device 130C is registered as a local communication device that is attached to the second virtual base station transceiver 315 within the first network 105 even though the communication device 130C is located remotely from the first network 105 (and is also attached to actual second base station transceiver 135 in the second network 110).

The first virtual base station transceiver 335 is similar to the second virtual base station transceiver 315 described above. For example, the first virtual base station transceiver 335 is a virtual instance of the first base station transceiver 115 that represents the actual first base station transceiver 115 of the first network 105. The first virtual base station transceiver 335 is located on the fourth server 160 and communicates with the second network core 330 through the second interface 350 (in other words, the second network core 330 uses the same interface to communicate to both the second base station transceiver 135 and the first virtual base station transceiver 335). Communication devices belonging to the first network 105 (for example, the communication devices 130A and 130B) are registered as local communication devices in both the first network core 310 (through an attachment process of communicating over the first network 105) and the second network core 330 (through communication over the third network 150 through the protocol-to-protocol converters 320 and 340). Because all communication devices attached to base station transceivers within the first network 105 and the second network 110 are registered in the both networks 105 and 110, from the perspective of all communication devices 130A through 130D within both networks 105 and 110, each network 105 and 110 includes all communication devices. Accordingly, communication devices located remotely from each other (for example, communication devices 130A and 130C) may communicate with each other as explained in greater detail below.

Although FIG. 3 shows each of the third server 155 and the fourth server 160 as including one virtual base station transceiver 315 and 335, respectively, in some embodiments, the servers 155 and 160 include additional virtual base station transceivers that represent other actual base stations in other isolated networks. In other words, one or both of the servers 155 and 160 may include a plurality of virtual base station transceivers. In such embodiments, the network core of the network in which a transmitting communication device is located identifies the virtual base station transceiver that corresponds to the actual base station transceiver that an intended recipient communication device is attached to. For example, when the communication device 130A desires to communicate with the communication device 130D, the first network core 310 identifies the second virtual base station transceiver 315 as representing the actual second base station transceiver 135 that the communication device 130D is attached to. Accordingly, the first network core 310 directs the communication from the communication device 130A to occur through the second virtual base station transceiver 315 as explained in greater detail below.

The protocol-to-protocol converters 320 and 340 of the respective third server 155 and fourth server 160 allow for such communication to occur over the third network 150. For example, the protocol-to-protocol converters 320 and 340 convert communication messages between a first communications protocol associated with the network cores 310 and 330 (for example, communication messages over a Long Term Evolution network) and a second communications protocol associated with a secondary communications network (for example, the third network 150 such as a land mobile radio network). In some embodiments, the protocol-to-protocol converters 320 and 340 are two-way converters that convert communication messages from the first communications protocol to the second communications protocol and vice versa. In other words, in some embodiments, the protocol-to-protocol converters 320 and 340 are bidirectional. In some embodiments, the first communications protocol includes high rate Long Term Evolution voice coding such as adaptive multi-rate wideband (AMR-WB). In some embodiments, the second communications protocol includes land mobile radio low rate coding such as improved multi-band excitation (IMBE) (for example, 7.2 kilobits per second or 3.6 kilobits per second). In other words, in some embodiments, a first bit rate of the Long Term Evolution voice coding is different (in this example, higher) than a second bit rate of the land mobile radio coding. In some embodiments, the protocol-to-protocol converters 320 and 340 add addressing bits of a destination address to a converted communication message by, for example, bit stealing the destination address from the original communication message as explained in greater detail below.

In some embodiments, the protocol-to-protocol converters 320 and 340 configure characteristics of the second communications protocol (for example, selecting the number of channels or selecting the bandwidth) based on the data being transmitted. For example, the protocol-to-protocol converters 320 and 340 may configure the base station transceivers 115 and 135 to transmit voice data or to transmit short message service (SMS) data that may be delivered by a narrowband land mobile radio system.

In the example shown in FIG. 3, the first protocol-to-protocol converter 320 is located on the third server 155 and is coupled to the second virtual base station transceiver 315. The second protocol-to-protocol converter 340 is located on the fourth server 160 and is coupled to the first virtual base station transceiver 335. Communication over the third network 150 between the first virtual base station transceiver 335 and the second virtual base station transceiver 315 occurs through the protocol-to-protocol converters 320 and 340 according to the second communications protocol. Although FIG. 3 shows the virtual base station transceivers 315 and 335 and the protocol-to-protocol converters 320 and 340 as part of the servers 155 160, in alternate embodiments, the virtual base station transceivers 315 and 335 and the protocol-to-protocol converters 320 and 340 are respectfully located on the server 120 and 140.

FIG. 4 is a diagram of the physical devices of the first server 120 according to one embodiment. As shown in FIG. 4, the first server 120 includes a second electronic processor 405, a second memory 410, and a second network interface 415. These components are similar to those described above with respect to the communication device 130 and perform similar functions. The second electronic processor 405 controls the second network interface 415 to send and receive data (for example, network packets) within or outside of the first sub-system 125, for example, to and from the second sub-system 145. For example, the second network interface 415 is coupled to the first base station transceiver 115 to wirelessly couple first network core 310, the communication devices 130A and 130B, and other components of the first network 105. Alternatively, or in addition, the second network interface 415 may include a connector or port for receiving a wired connection (for example, Ethernet) to the components of the first network 105. As mentioned previously herein, FIG. 4 is representative of the type of physical devices that may implement the components of the first server 120 shown in FIG. 3, including one or more elements of the first network core 310. In some embodiments, the second server 140 may include similar or identical physical devices that implement the components of the second server 140 shown in FIG. 3.

FIG. 5 is a diagram of the physical devices of the third server 155 according to one embodiment. As shown in FIG. 5, the third server 155 includes a third electronic processor 505, a third memory 510, and a third network interface 515. These components are similar to those described above with respect to the communication device 130 and perform similar functions. The third electronic processor 505 controls the third network interface 515 to send and receive data (for example, network packets) over the third network 150, for example, to and from the fourth server 160. For example, the third network interface 515 may wirelessly couple the first protocol-to-protocol converter 320 to the second protocol-to-protocol converter 340. Alternatively, or in addition, the third network interface 515 may include a connector or port for receiving a wired connection (for example, Ethernet) to the third network 150. As mentioned previously herein, FIG. 5 is representative of the type of physical devices that may implement the components of the third server 155 shown in FIG. 3, including one or more elements of the second virtual base station transceiver 315 and the first protocol-to-protocol converter 320. In some embodiments, the fourth server 160 may include similar or identical physical devices that implement the components of the fourth server 160 shown in FIG. 3.

As mentioned previously herein, in some embodiments, the first network 105 and the second network 110 are remotely-located from each other such that they do not have any overlap in their respective coverage areas (in other words, the first network 105 is isolated from the second network 110). In such embodiments, communication devices in the first network 105 (for example, communication device 130A) may not be able to communicate with communication devices in the second network 110 (for example, communication device 130D) using a first communications protocol used by devices within each of the networks 105 and 110. However, through the communications system 100, communication devices in the first network 105 may communicate with communication devices in the second network 110 over the third network 150 using a second communications protocol.

Figure 6:
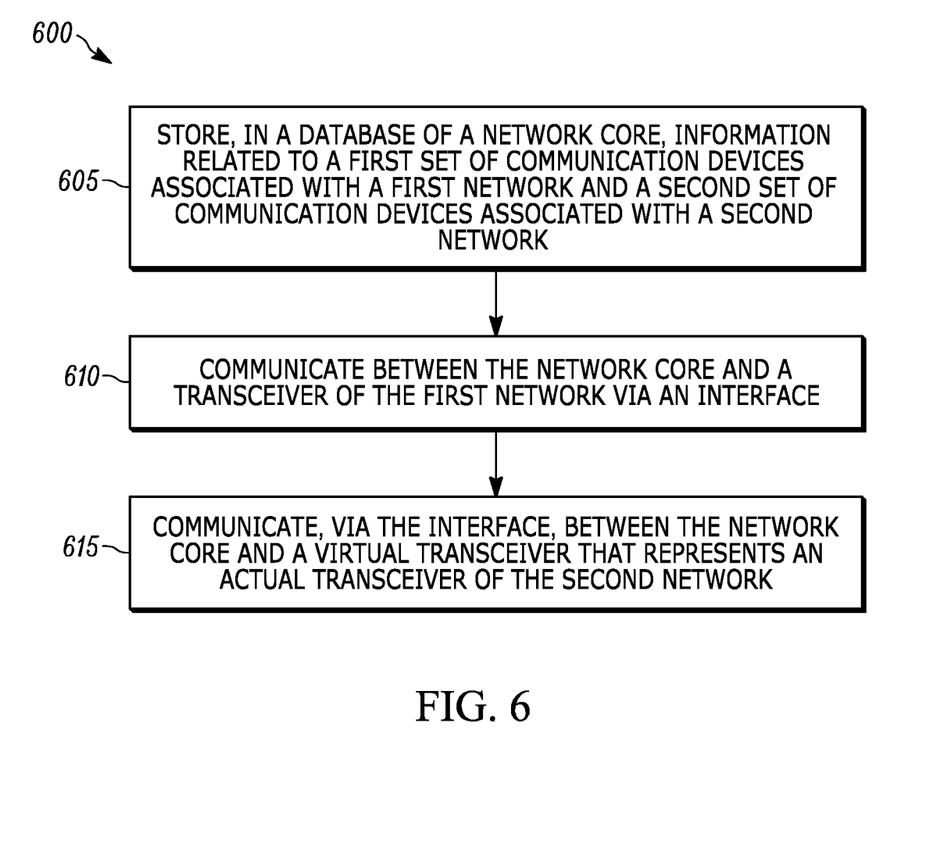
FIG. 6 is a flowchart of a method of receiving and forwarding a communication message performed by the first sub-system and the third server of FIGS. 1 and 3 according to one embodiment.
Figure 7:
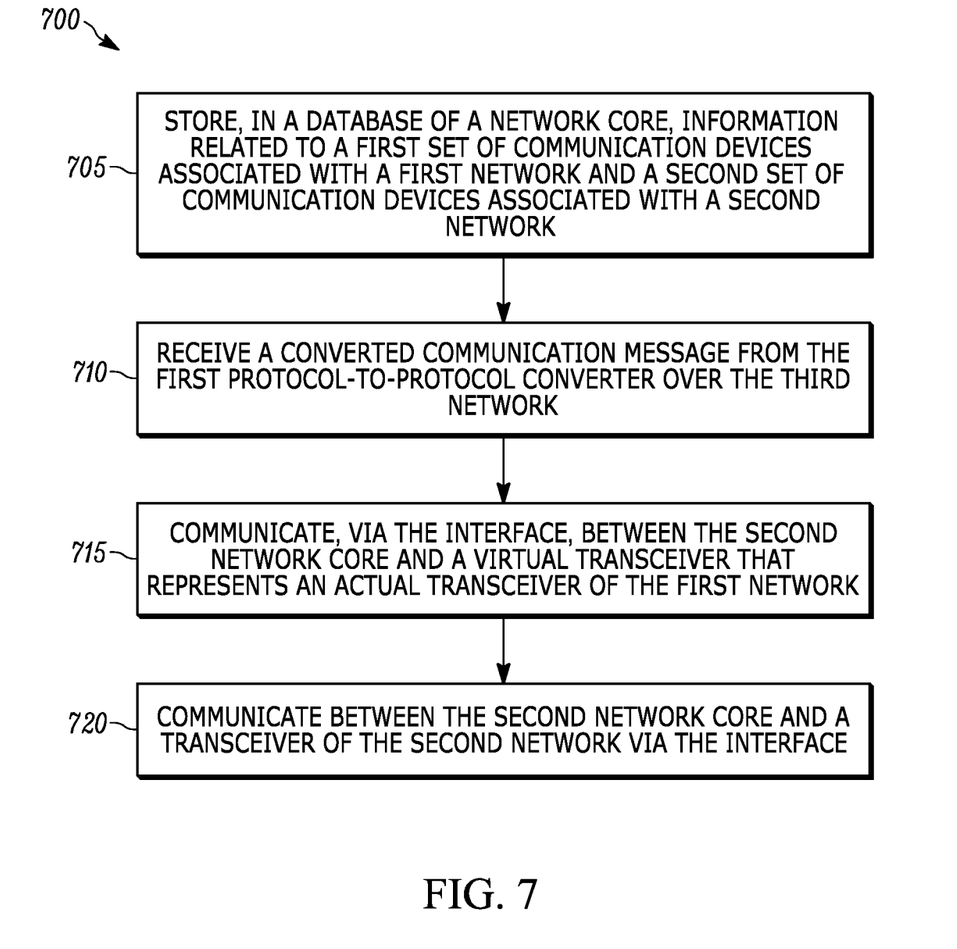
FIG. 7 is a flowchart of a method of receiving and forwarding a converted communication message performed by the second sub-system and the fourth server of FIGS. 1 and 3 according to one embodiment.

FIGS. 6 and 7 illustrate exemplary methods 600 and 700 of implementing communication from a communication device in the first network 105 to a communication device in the second network 110 over the third network 150. In the following description, the method 600 is described as being implemented by the third server 155 and the first sub-system 125, and the method 700 is described as being implemented by the fourth server 160 and the second sub-system 145. However, in some embodiments, the third server 155 and the first sub-system 125 are capable of implementing the method 700 and the fourth server 160 and the second sub-system 145 are capable of implementing the method 600. In some embodiments, other sub-systems and servers within the communications system 100 are capable of implementing both methods 600 and 700.

FIG. 6 illustrates a method 600 of the first sub-system 125 receiving a communication message from a communication device 130 in the first network 105 and the third server 155 forwarding the communication message to the second virtual base station transceiver 315 to be transmitted over the third network 150. At block 605, the first network core 310 stores information related to a first set of communication devices associated with a first network (for example, the first network 105) and a second set of communication devices associated with a second network (for example, the second network 110) in the first database 305 as explained previously herein. For example, the first network core 310 may receive information from the second virtual base station transceiver 315 relating to communication devices that are attached to the second base station transceiver 135 as explained previously herein.

At block 610, the first network core 310 communicates with the first base station transceiver 115 via the first interface 345 according to a first communications protocol (for example, an S1 interface according to Long Term Evolution network protocol). In some embodiments, this communication between the first network core 310 and the first base station transceiver 115 occurs when a communication device in the first network 105 (for example, the communication device 130A or, in other words, a transmitting communication device) sends a communication message to the first base station transceiver 115 indicating that the communication device 130A would like to call a communication device in the second network 110 (for example, the communication device 130D or, in other words, a recipient communication device). The first network core 310 receives this communication message from the first base station transceiver 115 through the first interface 345.

At block 615, the first network core 310 communicates with the second virtual base station transceiver 315 (that represents the actual second base station transceiver 135 of the second network 110) over the first interface 345. In accordance with the first communications protocol, the first network core 310 transmits the communication message (for example, voice data, short message service (SMS) data, voice over Long Term Evolution (VoLTE) data, Internet Protocol Multimedia Subsystem (IMS) derivatives, and the like) from the transmitting communication device 130A to the second virtual base station transceiver 315 because the recipient communication device 130D is attached to the second virtual base station transceiver 315 according to the first database 305. As mentioned previously herein, in embodiments where the third server 155 includes multiple virtual base station transceivers, the first network core 310 identifies the second virtual base station transceiver 315 based on the recipient communication device 130D being attached to the actual second base station transceiver 135 that is represented by the second virtual base station transceiver 315.

Up to this point, the communication message has been transmitted in accordance with the first communications protocol over the first interface 345. The second virtual base station transceiver 315 receives the communication message and forwards the communication message to the first protocol-to-protocol converter 320 to convert the communication message to the second communications protocol. The first protocol-to-protocol converter 320 may convert the communication message from the first communications protocol to the second communications protocol by, for example, reformatting the communication message according to the second communications protocol. The first protocol-to-protocol converter 320 may also add addressing bits of a destination address (in other words, the address of the recipient communication device 130D) to a converted communication message by, for example, stealing bits relating to the destination address from the communication message received from the base station transceiver 315. In some embodiments, the first protocol-to-protocol converter 320 determines the transmitting communication device 130A from the information included in the communication message. In such embodiments, the first protocol-to-protocol converter 320 includes information relating to the transmitting communication device 130A (for example, identification information, addressing information, and the like) in the converted communication message. Such information may be used by one or more components of the second sub-system 145 to determine which virtual base station transceiver to forward the communication message to (for example, when sub-systems include more than one virtual base station transceiver).

The first protocol-to-protocol converter 320 then transmits the converted communication message (for example, voice data and the addressing bits) to the second protocol-to-protocol converter 340 over the third network 150 according to the second communications protocol. Because the converted communication message was received from the second virtual base station transceiver 315, the first protocol-to-protocol converter 320 addresses the converted communication message to the actual base station transceiver that the second virtual base station transceiver 315 represents (in other words, the second base station transceiver 135).

FIG. 7 illustrates a method 700 of the fourth server 160 receiving a converted communication message from the third server 155 of the first network 105 over the third network 150 and the second sub-system 145 transmitting the converted communication message to the recipient communication device 130D in the second network 110. At block 705, the second network core 330 stores information related to the first set of communication devices associated with the first network 105 and the second set of communication devices associated with the second network 110 in the second database 325 as explained previously herein with respect to the first database 305. For example, the second network core 330 may receive information from the first virtual base station transceiver 335 relating to communication devices that are attached to the first base station transceiver 115.

At block 710, the second protocol-to-protocol converter 340 receives the converted communication message from the first protocol-to-protocol converter 320 over the third network 150. The second protocol-to-protocol converter 340 converts the converted communication message back from the second communications protocol to the first communications protocol. For example, the second protocol-to-protocol converter 340 extracts the addressing bits from the converted communication message to re-generate the original communication message from the communication device 130A. The second protocol-to-protocol converter 340 then forwards the communication message to the first virtual base station transceiver 335 (for example, based on the information relating to the transmitting communication device 130A as mentioned previously herein). For example, the second protocol-to-protocol converter 340 forwards the communication message to the first virtual base station transceiver 335 because the original message was from a communication device attached to an actual base station transceiver corresponding to the first virtual base station transceiver 335 (in other words, the first base station transceiver 115).

At block 715, the second network core 330 communicates with the first virtual base station transceiver 335 (that represents the actual first base station transceiver 115 of the first network 105) via the second interface 350 according to the first communications protocol. For example, the first virtual base station transceiver 335 transmits the communication message to the second network core 330.

At block 720, the second network core 330 communicates with the second base station transceiver 135 via the second interface 350 according to the first communications protocol. For example, in accordance with the first communications protocol, the second network core 330 transmits the communication message to the second base station transceiver 135 because the recipient communication device 130D is attached to the second base station transceiver 135 according to the second database 325. The second base station transceiver 135 then transmits the communication message to the recipient communication device 130D over the second network 110 according to the first communications protocol.

Thus, the communication message is able to be transmitted from the transmitting communication device 130A to the recipient communication device 130D even though the communication devices 130A and 130D are associated with remotely-located networks 105 and 110. Similar communication is possible from the communication devices in the second network 110 to the communication devices in the first network 105 (for example, with similar components performing similar functions and the protocol-to-protocol converters 320 and 340 performing opposite conversions).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of connecting isolated networks, the method comprising:
    storing, in a database of a network core of a first radio access network, information related to a first set of communication devices associated with the first radio access network and a second set of communication devices associated with a second radio access network, each of the first radio access network and the second radio access network being a first type of network in which the communication devices associated with each network communicate using a first communications protocol,
    the first radio access network having a first coverage area that does not overlap with a second coverage area of the second radio access network such that the communication devices associated with the first radio access network are unable to communicate with the communication devices associated with the second radio access network using the first communications protocol;
    communicating between the network core and a transceiver of the first radio access network via an interface;
    communicating, via the interface, between the network core and a virtual transceiver that represents an actual transceiver of the second radio access network; and
    communicating between the virtual transceiver and the second radio access network via a third radio access network using a second communications protocol that is different than the first communications protocol, the third radio access network being a second type of network that is different than the first type of network, the third radio access network having a third coverage area that overlaps at least a portion of the first coverage area and the second coverage area.

2. The method of claim 1, further comprising:
    receiving, from a transmitting communication device included in the first set of communication devices, a communication message intended for a recipient communication device included in the second set of communication devices;
    wherein communicating, via the interface, between the network core and the virtual transceiver that represents the actual transceiver of the second radio access network includes identifying the virtual transceiver from a plurality of virtual transceivers based on the recipient communication device being attached to the actual transceiver of the second radio access network.

3. The method of claim 1, wherein communicating between the virtual transceiver and the second radio access network via the third radio access network includes converting communication messages between the first communications protocol and the second communications protocol.

4. The method of claim 3, wherein converting communication messages between the first communications protocol and the second communications protocol includes converting communication messages from Long Term Evolution voice coding to land mobile radio coding, wherein a first bit rate of the Long Term Evolution voice coding is different than a second bit rate of the land mobile radio coding.

5. The method of claim 3, wherein the first type of network is a Long Term Evolution network and the second type of network is a land mobile radio narrowband network.

6. The method of claim 3, further comprising:
    storing, in a second database of a second network core of the second radio access network, the information related to the first set of communication devices associated with the first radio access network and the second set of communication devices associated with the second radio access network;

communicating between the second network core and a second transceiver of the second radio access network via a second interface;

communicating, via the second interface, between the second network core and a second virtual transceiver that represents a second actual transceiver of the first radio access network, the second interface and the interface operating according to the first communications protocol; and communicating between the second virtual transceiver and the first radio access network via the third radio access network using the second communications protocol.

7. The method of claim 1, wherein the network core comprises an evolved packet core and the first radio access network and the second radio access network comprise Long Term Evolution networks.

8. A communications system for connecting isolated networks, the communications system comprising:
a network core of a first radio access network including a database storing information related to a first set of communication devices associated with the first radio access network and a second set of communication devices associated with a second radio access network,
wherein each of the first radio access network and the second radio access network is a first type of network in which the communication devices associated with each network communicate using a first communications protocol,
wherein the first radio access network includes a first coverage area that does not overlap with a second coverage area of the second radio access network such that the communication devices associated with the first radio access network are unable to communicate with the communication devices associated with the second radio access network using the first communications protocol;
a first virtual transceiver representing an actual transceiver of the second radio access network;
an interface configured to allow communications between the network core and a transceiver of the first radio access network and between the network core and the first virtual transceiver; and
a third radio access network configured to allow communications between the first virtual transceiver and the second radio access network using a second communications protocol that is different than the first communications protocol, wherein the third radio access network is a second type of network that is different than the first type of network, and the third radio access network includes a third coverage area that overlaps at least a portion of the first coverage area and the second coverage area.

9. The communications system of claim 8, further comprising a protocol-to-protocol converter configured to convert communication messages between the first communications protocol associated with the network core and the second communications protocol associated with the third network.

10. The communications system of claim 9, wherein the protocol-to-protocol converter converts communication messages from Long Term Evolution voice coding to land mobile radio coding, wherein a first bit rate of the Long Term Evolution voice coding is different than a second bit rate of the land mobile radio coding.

11. The communications system of claim 8, wherein the first type of network comprises a Long Term Evolution network and the second type of network comprises a land mobile radio narrowband network.

12. The communications system of claim 9, further comprising:
a second network core of the second radio access network including a second database storing the information related to the first set of communication devices associated with the first radio access network and the second set of communication devices associated with the second radio access network;
a second virtual transceiver representing a second actual transceiver of the first radio access network; and
a second interface configured to allow communications between the second network core and a second transceiver of the second radio access network and between the second network core and the second virtual transceiver, wherein the second interface and the interface operate according to the first communications protocol;
wherein the third radio access network is configured to allow communications between the second virtual transceiver and the first radio access network using the second communications protocol.

13. The communications system of claim 12, wherein the first virtual transceiver and the second virtual transceiver are configured to communicate with each other through a first protocol-to-protocol converter and a second protocol-to-protocol converter according to the second communications protocol.

14. The communications system of claim 8, wherein the network core comprises an evolved packet core and the first radio access network and the second radio access network comprise Long Term Evolution networks.

15. The communications system of claim 8, wherein the transceiver of the first radio access network is configured to receive, from a transmitting communication device included in the first set of communication devices, a communication message intended for a recipient communication device included in the second set of communication devices;
wherein the network core is configured to identify the first virtual transceiver from a plurality of virtual transceivers based on the recipient communication device being attached to the actual transceiver of the second radio access network.

16. A communications system for connecting isolated networks, the communications system comprising:
an Evolved Packet Core of a first Long Term Evolution network including a database storing information related to a first set of communication devices associated with the first Long Term Evolution network and a second set of communication devices associated with a second Long Term Evolution network,
wherein each of the first Long Term Evolution network and the second Long Term Evolution network is a first type of network in which the communication devices associated with each network communicate using a Long Term Evolution network protocol,
wherein the first Long Term Evolution network includes a first coverage area that does not overlap with a second coverage area of the second Long Term Evolution network such that the communication devices associated with the first Long Term Evolution network are unable to communicate with the communication devices associated with the second Long Term Evolution network using the Long Term Evolution network protocol;

a first virtual Evolved Node B representing an actual Evolved Node B of the second Long Term Evolution network; and an S1 interface configured to allow communications between the Evolved Packet Core and an Evolved Node B of the first Long Term Evolution network and between the Evolved Packet Core and the first virtual Evolved Node B; and a land mobile radio network configured to allow communications between the first virtual Evolved Node B and the second Long Term Evolution network using a land mobile radio network protocol that is different than the Long Term Evolution network protocol, wherein the land mobile radio network is a second type of network that is different than the first type of network, and the land mobile radio network includes a third coverage area that overlaps at least a portion of the first coverage area and the second coverage area.

17. The communications system of claim 16, further comprising a protocol-to-protocol converter configured to convert communication messages between the Long Term Evolution network protocol associated with the Evolved Packet Core and the land mobile radio network protocol associated with a land mobile radio network.

18. The communications system of claim 17, wherein the protocol-to-protocol converter is configured to convert communication messages from Long Term Evolution voice coding to land mobile radio coding, wherein a first bit rate of the Long Term Evolution voice coding is different than a second bit rate of the land mobile radio coding.

19. The communications system of claim 16,
wherein the Evolved Packet Core is configured to receive, from a transmitting communication device included in the first set of communication devices, a communication message intended for a recipient communication device included in the second set of communication devices; and wherein the Evolved Packet Core is configured to identify the first virtual Evolved Node B from a plurality of virtual Evolved Node Bs based on the recipient communication device being attached to the actual Evolved Node B of the second Long Term Evolution network.

20. The communications system of claim 16, further comprising:

a second Evolved Packet Core of the second Long Term Evolution network including a second database storing the information related to the first set of communication devices associated with the first Long Term Evolution network and the second set of communication devices associated with the second Long Term Evolution network;

a second virtual Evolved Node B representing a second actual Evolved Node B of the first Long Term Evolution network; and a second S1 interface configured to allow communications between the second Evolved Packet Core and a second Evolved Node B of the second Long Term Evolution network and between the second Evolved Packet Core and the second virtual Evolved Node B, wherein the second S1 interface and the S1 interface operate according to the Long Term Evolution network protocol;

wherein the land mobile radio network is configured to allow communications between the second virtual Evolved Node B and the first Long Term Evolution network using the land mobile radio network protocol.

* * * * *